United States Patent
Zhou

(10) Patent No.: US 7,769,093 B2
(45) Date of Patent: Aug. 3, 2010

(54) BLIND SELECTED MAPPING FOR PEAK-TO-AVERAGE POWER RATIO REDUCTION IN OFDM WITH PSK INPUT

(75) Inventor: Guotong Zhou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 790 days.

(21) Appl. No.: 11/487,566

(22) Filed: Jul. 14, 2006

(65) Prior Publication Data

US 2010/0166086 A1 Jul. 1, 2010

(51) Int. Cl.
*H04K 1/10* (2006.01)
(52) U.S. Cl. ............. 375/260; 375/259; 375/295; 375/219; 375/316; 370/206
(58) Field of Classification Search ........... 375/260, 375/259, 295, 219, 316; 370/206
See application file for complete search history.

(56) References Cited

U.S. PATENT DOCUMENTS

| | | | | |
|---|---|---|---|---|
| 6,628,726 | B1 * | 9/2003 | Breiling | 375/260 |
| 7,391,713 | B2 * | 6/2008 | Anvari | 370/206 |
| 2005/0141408 | A1 * | 6/2005 | Anvari | 370/206 |
| 2006/0140296 | A1 * | 6/2006 | Cleveland et al. | 375/260 |

OTHER PUBLICATIONS

Y. C. Cho, et al, "Selected mapping technique with novel phase sequences for PAPR reduction of an OFDM signal," Proc. IEEE 60th Vehicular Technology Conference, vol. 7, pp. 4781-4785, Sep. 2004.*

Baum, R. W. et al., "Reducing the Peak-to-Average Power Ratio of Multicarrier Modulation by Selected Mapping", Electronics Letters, Oct. 24, 1996, vol. 32, No. 22, pp. 2056-2057.

Baxley, Robert J. et al., "MAP Metric for Blind Phase Sequence Detection in Selected Mapping", IEEE Transactions on Broadcasting, Dec. 2005, vol. 51, No. 4, pp. 565-570.

Chen, Ning et al., "Peak-to-Average Power Ratio Reduction in OFDM with Blind Selected Pilot Tone Modulation", IEEE 2005, pp. 845-848.

Cho, Yang Chan et al., "Selected Mapping Technique with Novel Phase Sequences for PAPR Reduction of an OFDM Signal", IEEE 2004, pp. 4781-4785.

Han, Seung Hee et al., "An Overview of Peak-to-Average Power Ratio Reduction Techniques for Multicarrier Transmission", Modulation, Coding and Signal Processing for Wireless Communications, IEEE Wireless Communications, Apr. 2005, pp. 56-65.

(Continued)

*Primary Examiner*—David C Payne
*Assistant Examiner*—Zewdu Kassa
(74) *Attorney, Agent, or Firm*—Ryan A. Schneider, Esq.; Troutman Sanders LLP

(57) ABSTRACT

Orthogonal frequency division multiplexing (OFDM) is a spectrally efficient multicarrier modulation technique for high speed data transmission over multipath fading channels, but has low power efficiency. OFDM signals have large crest factors, or peak-to-average power ratios (PARs) which lead to power inefficiency in the RF portion of the transmitter. Selected mapping (SLM) is a distortionless technique that has good PAR reduction capability. However, the biggest limitation of SLM is the need to transmit side information. Disclosed is a technique or algorithm using constant modulus (i.e., phase shift keying, PSK) inputs that implements SLM without having to transmit any side information and without causing any distortion.

18 Claims, 6 Drawing Sheets

OTHER PUBLICATIONS

Jayalath A. D. S. et al., "A Blind SLM Receiver for PAR-Reduced OFDM", IEEE 2002, pp. 219-222.

Mestdagh, Denis J. G. et al., "A Method to Reduce the Probability of Clipping in DMT-Based Transceivers", IEEE Transactions on Communications, Oct. 1996, vol. 44, No. 10, pp. 1234-1238.

Ohkubo, Naoto et al., "Design Criteria for Phase Sequences in Selected Mapping", IEEE 2003, pp. 373-377.

Wang, Hao et al., "On the Distribution of Peak-to-Average Power Ratio for Non-Circularly Modulated OFDM Signals", Globecom 2003, pp. 502-506.

Zhou, G. Tong et al., "Optimality Condition for Selected Mapping in OFDM", IEEE Transactions on Signal Processing, Aug. 2006, vol. 54, No. 8, pp. 3159-3165.

\* cited by examiner

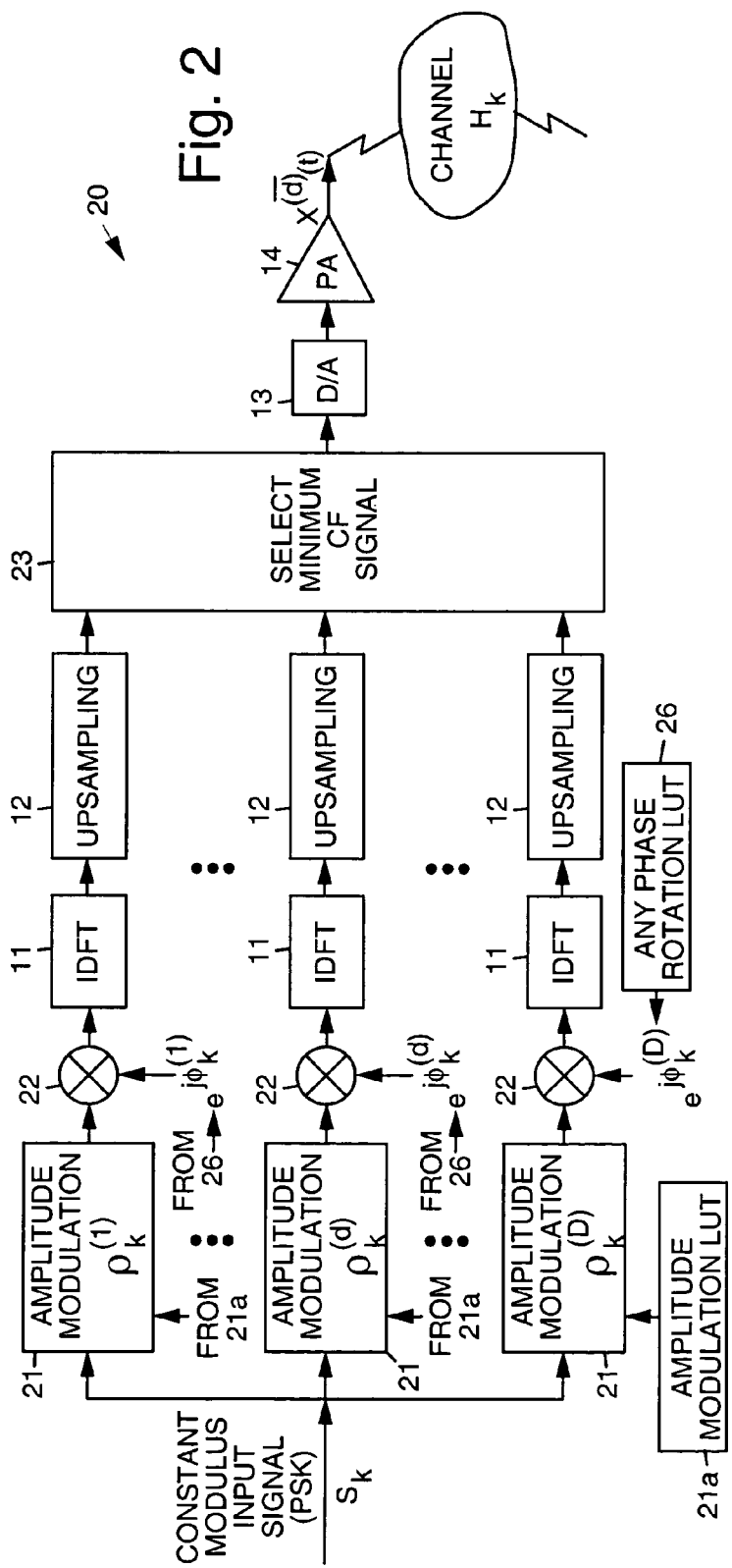
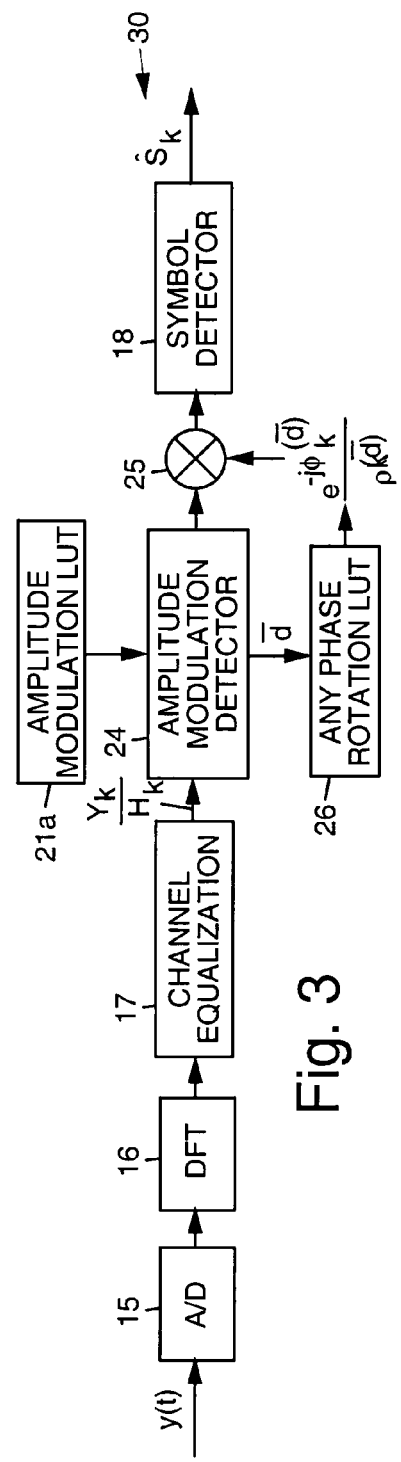
Fig. 2
Fig. 3

BLIND SELECTED MAPPING FOR PEAK-TO-AVERAGE POWER RATIO REDUCTION IN OFDM WITH PSK INPUT

STATEMENT REGARDING FEDERALLY SPONSORED RESEARCH OR DEVELOPMENT

This invention was made with support from the U.S. Army Research Laboratory under contract No. DAAD19-01-2-0011. The U.S. Government may have a paid-up license in this invention and the right in limited circumstances to require the patent owner to license to others on reasonable terms as provided for by the terms of the Agreement.

BACKGROUND

The present invention relates to RF transmission systems and methods, and more particularly, to peak-to-average power ratio (PAR) reduction in orthogonal frequency division multiplexing (OFDM) systems with phase shift keying (PSK) input signals using blind selected mapping (SLM).

OFDM is a transmission format that has gained much popularity over the past decade. It is used in Asymmetric Digital Subscriber Line (ADSL), Wireless Local Area Network (WLAN), European Digital Audio Broadcast (DAB), Digital Video Broadcast (DVB) applications, and is under consideration for Worldwide Interoperability for Microwave Access (WiMAX).

A serious drawback of OFDM is the high peak-to-average power ratio (PAR), or crest factor (CF) (which is the square root of the PAR), of its time domain waveforms. The occurrence of occasional large peaks places stringent demands on the dynamic range and linearity of analog components such as the digital-to-analog converter (DAC) and the power amplifier (PA). Because the PA is a peak power limited device, a high PAR signal will have to be transmitted at a low average power level if nonlinear distortion is to be avoided. The resulting DC to RF power conversion efficiency is low, thus the battery drain or the network operating cost would be high. PAR reduction is often necessary before the signal is sent to the DAC and the PA.

Generally speaking, PAR reduction algorithms fall into two categories. Algorithms with distortion such as clipping and companding are relatively simple to implement, but the drawbacks include in-band distortion and out-of-band spectral regrowth. This is discussed by J. Tellado, in *Multicarrier Modulation with Low PAR: Applications to DSL and Wireless*, Kluwer Academic Publishers, 2000, and S. H. Han et al., "An overview of peak-to-average power ratio reduction techniques for multicarrier transmission," *IEEE Wireless Communications*, vol. 12, no. 2, pp. 56-65, April 2005, and references cited therein. Distortionless PAR reduction algorithms include coding, selected mapping (SLM), partial transmit sequence, tone reservation, tone injection, active constellation extension, and so forth. Distortionless methods tend to be more computationally intensive, and result in lower data rate or spectral efficiency because of the need to transmit side information.

The SLM method, such as is discussed in papers by R. W. Bauml, et al., "Reducing the peak-to-average power ratio of multicarrier modulation by selected mapping," *Electronics Letters*, vol. 32, no. 22, pp. 2056-2057, October 1996, and D. J. G. Mestdagh and P. M. P. Spruyt, "A method to reduce the probability of clipping in DMT-based transceivers," *IEEE Trans. on Communications*, vol. 44, no. 10, pp. 1234-1238, October 1996, for example, has good PAR reducing capability and is distortionless. The drawback of the SLM method disclosed in these papers is that side information needs to be transmitted as well, thus lowering the data rate. It would be desirable to have an improved SLM technique that avoids the transmission of any side information and entails an accurate detection scheme to retrieve the side information at the receiver. The present invention addresses this issue when the frequency domain OFDM signal $S_k$ is drawn from a constant modulus (i.e., PSK) constellation.

A concept related to the presently disclosed algorithm was discussed in Y. C. Cho, et al., "Selected mapping technique with novel phase sequences for PAPR reduction of an OFDM signal," *Proc. IEEE 60th Vehicular Technology Conference*, vol. 7, pp. 4781-4785, September 2004. Denote by $X_k^{(d)}$ the dth alternative representation of the information signal $S_k$. In the Cho et al paper, up to 10% of the subcarriers whose positions are pre-determined according to a lookup table (LUT) indexed by d, are mapped from $S_k$ to $X_k^{(d)}$ according to $X_k^{(d)} = -\mu S_k$, $\mu > 1$; the rest subcarriers remain unchanged; i.e., $X_k^{(d)} = S_k$, $\mu > 1$ is a carefully chosen constant to ensure that "the minimum distance between modified signal point and adjacent signal point is larger than the minimum distance between the original signal points." Cho, et al. reported performance degradation in terms of the PAR reducing capability as compared with the original SLM, as well as an increase in the average transmit power. Cho et al. limit the phase changes in $X_k^{(d)}$ to $\pi$ (as in $X_k^{(d)} = -\mu S_k$) and 0 (as in $X_k^{(d)} = S_k$) only and their corresponding probabilities are much skewed (less than 10% and more than 90%, respectively).

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a reduced-to-practice transmitter;

FIG. 3 illustrates a reduced-to-practice receiver;

DETAILED DESCRIPTION

Disclosed herein are a novel crest factor reduction (CFR) technique (algorithm) and apparatus that provide for OFDM systems using blind SLM. In the disclosed technique (algorithm) and apparatus, constant modulus (i.e., PSK) input signals are processed. The disclosed technique (algorithm) and apparatus permits SLM without having to transmit any side information and without causing distortion.

The technique provides a way to structure SLM so that the side information can be recovered from the received data itself, i.e., blindly. The technique is applicable to the case where the frequency domain OFDM input signal $S_k$ has a constant modulus; i.e., it is drawn from a phase shift keying (PSK) constellation. The algorithm is simple to implement, has the same PAR reducing capability as the SLM method discussed in the R. W. Bauml, et al. and D. J. G. Mestdagh, et al. papers, and performs well in the presence of noise. It is an enabling technology for SLM, which in turn makes OFDM more power efficient and less vulnerable in the face of non-linearities.

In contrast to Cho et al., the present technique allows a broad class of amplitude modulations $\rho_k^{(d)}$ and phase rotations $\phi_k^{(d)}$ to yield the dth alternative representation of $S_k$ as $$X_k^{(d)} = \rho_k^{(d)} e^{j\phi_k^{(d)}} S_k.$$

In the present technique, $$(i) E\left[e^{j\phi_k^{(d)}}\right] = 0$$

(approximately) holds, and (ii) $\rho_k^{(d)}$ and $\rho_k^{(d)}$ are sufficiently distinct for $d_1 \neq d_2$. Condition (i) ensures that there is no degradation in the PAR reduction performance as compared to the original SLM. Condition (ii) ensures that the SLM index $\overline{d}$ can be accurately detected at the receiver. In contrast to Cho et al, the present algorithm takes advantage of the constant modulus property of $S_k$ to devise a simple and accurate blind SLM receiver.

Figure 1:
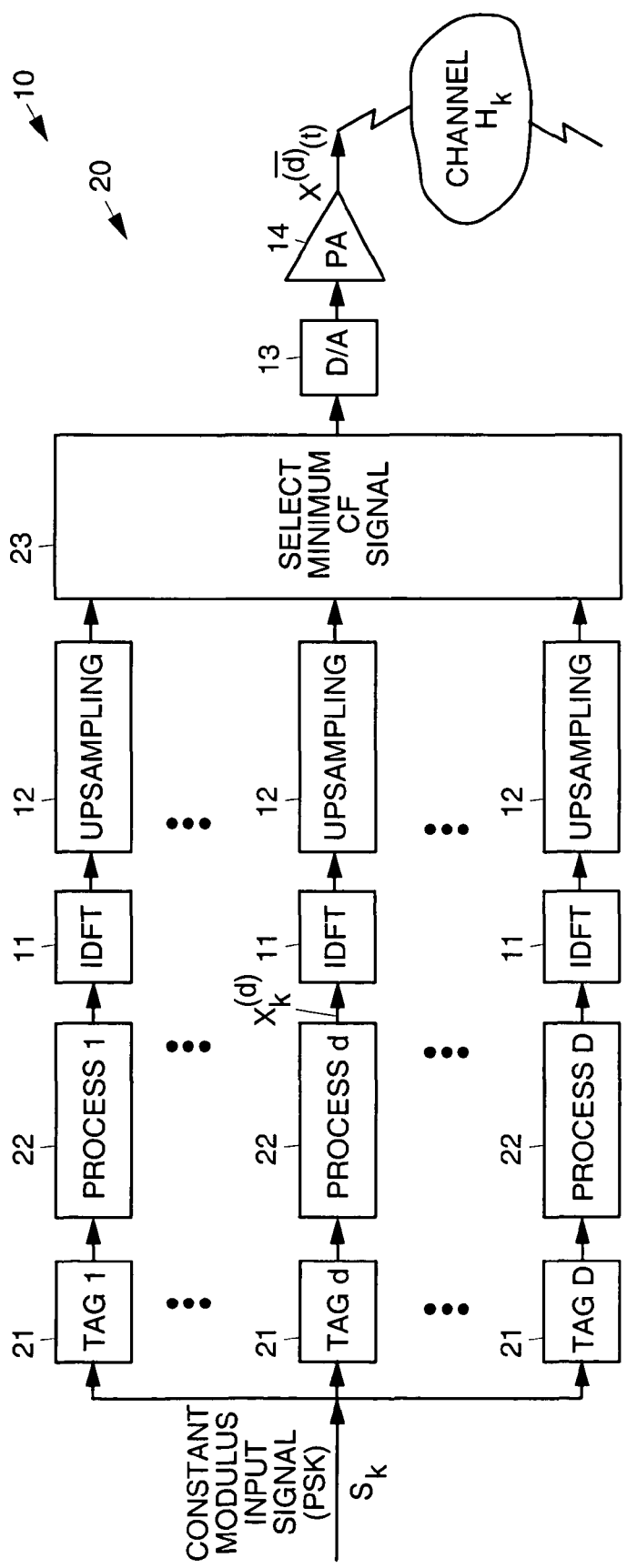
FIG. 1 illustrates an exemplary blind SLM communication system using constant modulus (i.e., phase shift keying or PSK) inputs.

Referring now to the drawing figures, FIG. 1 illustrates an exemplary blind SLM communication system 10 that processes constant modulus (i.e., PSK) input signals. FIG. 2 illustrates an exemplary reduced-to-practice blind SLM transmitter 20, and FIG. 3 illustrates an exemplary reduced-to-practice blind SLM receiver 30.

FIG. 1 shows an exemplary generic blind SLM communication system 10. The generic system 10 comprises a SLM transmitter 20 and a blind SLM receiver 30. The transmitter 20 processes a frequency domain signal $S_k$ that is to be transmitted over a wireless channel using a tagging process 21 that uniquely identifies each block of data in a plurality of sub-channels. The signal output of the tagging process 21 is then transformed by way of a differentiating process 22 (Process 1 . . . . Process d . . . Process D) that is used to differentiate the blocks of data in each of the plurality of sub-channels. The differentiating process 22 comprises an invertible transform for generating different sub-channel signals. Each of the blocks of data in each of the plurality of sub-channels is then conventionally processed by an inverse discrete Fourier transform (IDFT) 11, and is upsampled 12. The blocks of data in each of the plurality of sub-channels are then processed 23 to select the channel (or block of data) having the minimum crest factor (CF), or peak-to-average power ratio (PAR). The block of data in the selected sub-channel $\overline{d}$ is then converted to an analog signal using a digital-to-analog (D/A) converter 13. The analog signal output by the D/A converter 13 is input to a power amplifier 14 for transmission over the wireless channel to the receiver 30.

At the receiver 30, the received block of data is digitized using an analog-to-digital converter 15 and is transformed to the frequency domain using a discrete Fourier transform (DFT) circuit 16. Channel equalization is performed on the received frequency domain signal to remove the effects of the wireless channel. The tag generated by the tagging process 21 in the transmitter 20 is then detected using a tag detector 24. This identifies the sub-channel indexed by $\overline{d}$ that was used to transmit the block of data. Then, an inverse differentiating process 25 is performed to de-rotate the phase of the detected signal, and this signal is processed by a symbol detector 18 to output an estimate $\hat{S}_k$ of the frequency domain signal transmitted by the transmitter 20.

With the above in mind, a reduced-to-practice implementation of the technique using blind SLM will now be discussed.

Referring to FIG. 2, an exemplary reduced-to-practice transmitter 20 processes the frequency domain signal $S_k$ by first amplitude modulating $S_k$ in a unique way according to an amplitude modulation lookup table 21a; therefore, unique amplitude tags are associated with the blocks of data in each of the plurality of sub-channels. The blocks of data output by the amplitude tagging process 21 are processed using the differentiating process 22 to separately rotate the phases of each signal in the block of data. The differentiating process 22 may comprise a phase lookup table 26 containing a plurality of pseudo-random phase sequences that are used to rotate the phases of the frequency domain signal $S_k$ in the sub-channels. The combination of the amplitude tagging process 21 and differentiating process 22 uniquely identify each block of data and each sub-channel.

The individual amplitude modulated and phase rotated sub-channels (blocks of data) are each inverse discrete Fourier transformed 11 and upsampled 12. Each of the inverse Fourier transformed and upsampled sub-channels are then processed 23 to select the sub-channel (block of data) having the minimum crest factor (CF), or peak-to-average power ratio (PAR). The selected $\overline{d}$ th signal (sub-channel) having the minimum crest factor is converted to an analog signal by a digital-to-analog (D/A) converter 13 and input to a power amplifier 14 for transmission over the channel.

As is shown in FIG. 3, an exemplary reduced-to-practice receiver 30 comprises an analog-to-digital (A/D) converter 15 that converts a received analog signal into a digital signal corresponding to the sub-channel that was transmitted. The digital signal is discrete Fourier transformed 16. Channel equalization is performed on the received frequency domain signal to remove the effects of the wireless channel. The equalized signal is then processed by an amplitude tag detector 24 that detects the amplitude tag that was generated at the transmitter 20, by comparing with amplitude function templates stored in the amplitude modulation lookup table 21a, thus identifying the sub-channel that was transmitted. The amplitude tag detector 24 outputs an index ($\overline{d}$) that is also indicative of the phase rotation used in the differentiating process 22 used in the transmitter 20. The phase lookup table 26 outputs the $\overline{d}$ th phase sequence for the consequent phase de-rotation. The detected signal is then phase de-rotated 25 using the output phase sequence from the phase lookup table 26. The phase de-rotated signal is processed by a symbol detector 18 to produce an estimate of the constant modulus frequency domain signal transmitted by the transmitter 20.

To better understand implementation of the communication system 10 and algorithm, OFDM and blind SLM will be discussed in detail along with details of the blind SLM algorithm.

Overview of Orthogonal Frequency Division Multiplexing and SLM

Denote $\{S_k\}_{k=0}^{N-1}$ as the frequency domain OFDM signal, where k is the subcarrier index and N is the number of sub-carriers. The Nyquist-rate sampled time-domain OFDM signal $s_n$ is obtained as the inverse discrete Fourier transform (IDFT) of $S_k$; i.e., $$s_n = \frac{1}{\sqrt{N}} \sum_{k=0}^{N-1} S_k e^{\frac{j2\pi kn}{N}}, \quad 0 \leq n \leq N-1. \quad (1)$$

If $E[|S_k|^2]=A^2$, then $E[|s_n|^2]=A^2$ as well.

The peak-to-average power ratio (PAR) of $s_n$ is defined as $$PAR\{s_n\} = \frac{\max_{0 \leq n \leq N-1} |s_n|^2}{E[|s_n|^2]}, \quad (2)$$

To investigate the distribution of $|s_n|^2$, some discussion on circular symmetry is necessary. Let $S_k = a_k + jb_k$ where $a_k$ and $b_k$ are the real and imaginary parts of $S_k$, respectively. Assume that $S_k$ has zero-mean; i.e., $E[a_k]=E[b_k]=0$. If $a_k$ and $b_k$ are uncorrelated ($E[a_k b_k]=0$), and the real and imaginary parts have the same power ($E[a_k^2]=E[b_k^2]$), then $S_k$ is circularly symmetric. Most digital communication signals are circularly symmetric; e.g., quadrature amplitude modulation (QAM) or M-ary PSK constellations with M>2. Real-valued signals have $b_k=0$ and are thus not circularly symmetric. The binary PSK (BPSK) signal belongs to this category.

According to D. R. Brillinger, *Time Series: Data Analysis and Theory*, Holden-day Inc., San Francisco, 1981, Chapter 4, when N is large, the real and imaginary parts of $s_n$, $\text{Re}\{s_n\}$ and $\text{Im}\{s_n\}$, are approximately Gaussian distributed. Furthermore, if $S_k$ is circularly symmetric, then $\text{Re}\{s_n\}$ and $\text{Im}\{s_n\}$ are mutually uncorrelated and thus mutually independent for the Gaussian distribution. This allows expression of the complementary cumulative distribution function (CCDF) of the PAR of the time-domain OFDM signal as $$\Pr(PAR\{s_n\} > \gamma) = 1 - (1 - e^{-\gamma})^N. \quad (3)$$

This expression holds only if $S_k$ is circularly symmetric.

When $S_k$ is real-valued, $\text{Re}\{s_n\}$ and $\text{Im}\{s_n\}$ are no longer (asymptotically) mutually uncorrelated. In this case, H. Wang et al., "On the distribution of peak-to average power ratio for non-circularly modulated OFDM signals," *Proc. IEEE Global Telecommunications Conference*, vol. 1, pp. 502-506, December 2003 discloses the following closed-form expression for the PAR of $s_n$:

$$Pr(PAR\{s_n\} > \gamma) = 1 - (1 - efrc(\sqrt{\gamma/2}))^2 (1 - e^{-\gamma})^{\frac{N-2}{2}}, \quad (4)$$

where $$efrc(\gamma) = \frac{2}{\sqrt{\pi}} \int_\gamma^\infty e^{-t^2} dt.$$

For example, when $S_k$ is BPSK, the CCDF of PAR $\{s_n\}$ obeys equation (4), not equation (3).

In SLM as discussed in the R. W. Bauml, et al. and D. J. G. Mestdagh, et al. papers, form $$U_k^{(d)} = S_k e^{j\phi_k^{(d)}}, \quad 0 \leq k \leq N-1, \quad 1 \leq d \leq D, \quad (5)$$

as D different representations of the same signal $S_k$, where $\{\phi_k^{(d)}\}$ are fixed pseudo-random phase sequences that are available to both the transmitter and the receiver. By default, $\phi_k^{(d)}=0$, $\forall k$, thus $U_k^{(1)}=S_k$, representing the original OFDM signal. Next, the corresponding time-domain signal $u_n^{(d)}$ is determined according to equation (1). In SLM, the transmitted signal, $u_n^{(\bar{d})}$, has the lowest PAR among the D candidate OFDM signals (including the original $s_n$), where $$\bar{d} = \arg \min_{1 \leq d \leq D} PAR\{u_n^{(d)}\}. \quad (6)$$

$\bar{d}$ is sensitive to the data $S_k$ and typically varies from block to block.

From G. T. Zhou et al., "Optimality condition for selected mapping in OFDM," *IEEE Trans. on Signal Processing*, August 2006, if each phase sequence $\{\phi_k^{(d)}\}_{k=0}^{N-1}$ is independent identically distributed (i.i.d.) satisfying $$E\left[e^{j\phi_k^{(d)}}\right] = 0, \quad (7)$$

and if the phase sequences are mutually independent, then for N large, the CCDF of the PAR of the SLM OFDM signal $u_n^{(\bar{d})}$ is $$\Pr(PAR\{u_n^{(\bar{d})}\} > \gamma) = (\Pr(PAR\{u_n^{(d)}\} > \gamma))^D. \quad (8)$$

where $\Pr(PAR\{u_n^{(d)}\} > \gamma)$ is given by equation (3) if $u_n^{(d)}$ is circularly complex or by equation (4) if $u_n^{(d)}$ is real-valued.

If $S_k$ is circularly symmetric, then $U_k = S_k e^{j\phi_k}$ is circularly symmetric as well. If $S_k$ is real-valued but $e^{j\phi_k}$ is circularly symmetric, then $U_k = S_k e^{j\phi_k}$ is circularly symmetric. In either case, the CCDF of the PAR of the SLM OFDM signal is $$\Pr(PAR\{u_n^{(\bar{d})}\} > \gamma) = (1 - (1 - e^{-\gamma})^N)^D. \quad (9)$$

If $S_k$ is real-valued (such as BPSK), and $e^{j\phi_k}$ is real-valued as well (i.e., ±1), then $U_k = S_k e^{j\phi_k}$ is real-valued and the CCDF of the PAR of the SLM OFDM signal is given by $$Pr(PAR\{u_n^{(\bar{d})}\} > \gamma) = \left(1 - (1 - efrc(\sqrt{\gamma/2}))^2 (1 - e^{-\gamma})^{\frac{N-2}{2}}\right)^D. \quad (10)$$

Figure 4:
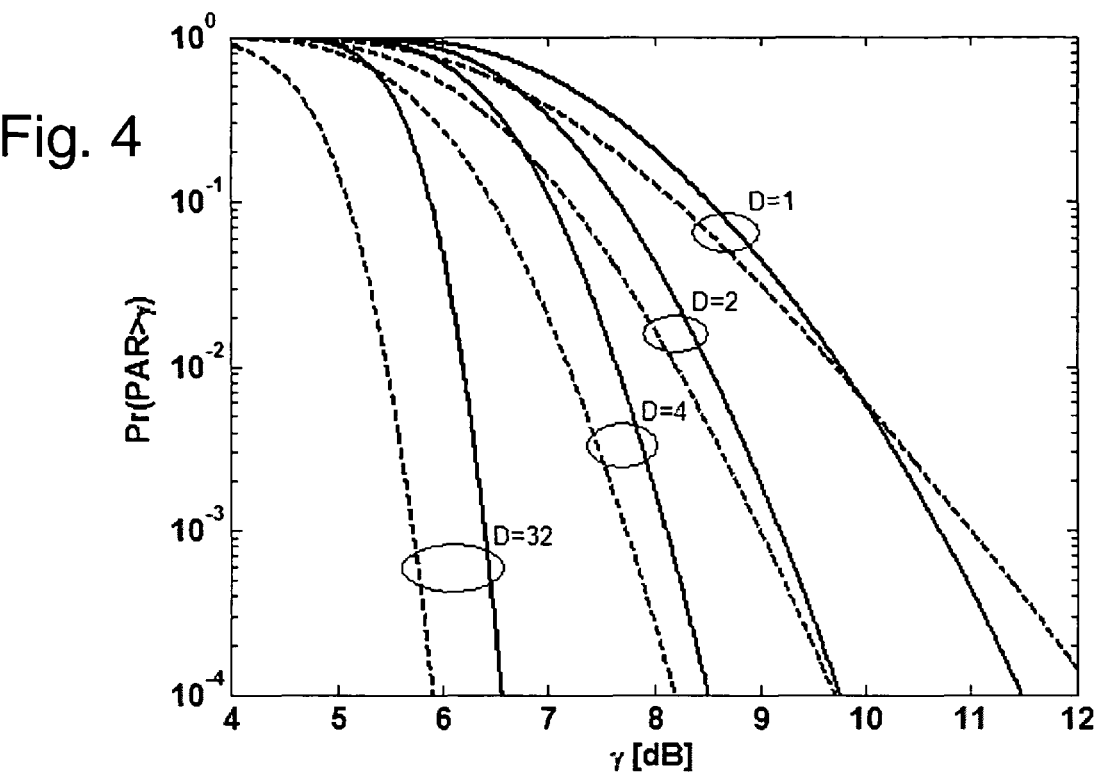
FIG. 4 is a graph showing exemplary theoretical complementary cumulative distribution functions (CCDF) of SLM OFDM signals when $S_k$ is binary PSK (BPSK) or quadrature PSK (QPSK)

Equation (9) and equation (10) are plotted in solid lines and dashed lines, respectively, for D=1, 2, 4, and 32 in FIG. 4. It is seen that the CCDF curves lower as D is increased, but there is a diminishing return in using large D values. The computational complexity brought on by the extra IDFTs increases with D.

It may be seen from FIG. 4 that for a low CCDF level such as $10^{-4}$, the CCDF curve corresponding to equation (10) (dashed line) is higher than that corresponding to equation (9) (solid line) for D=1, but the situation is reversed as D increases. Therefore, SLM is more effective in reducing the PAR when $S_k$ is real-valued than when $S_k$ is circularly symmetric.

Regarding the phase table design, the simple choice of $\phi_k^{(d)} \in \{0,\pi\}$ with equal probability, which corresponds to $$e^{j\phi_k^{(d)}} \in \{1, -1\}$$

with equal probability, is as good as any other phase sequence in terms of the PAR reducing capability; the key is to satisfy equation (7). In that case, the implementation of equation (5) becomes very simple: $U_k^{(d)}=S_k$ or $U_k^{(d)}=-S_k$ according to the sign table. The receiver must know the optimum sequence index $\bar{d}$ in order to decode. It is this side information transmission issue that has hindered the practical application of SLM, which is addressed by the present invention.

Blind SLM was discussed by A. D. S. Jayalath et al., in "A blind SLM receiver for PAR-reduced OFDM," *Proc. IEEE Vehicular Technology Conference*, pp. 219-222, September 2002, which disclosed capitalizing on the finite alphabet nature of the input constellation. In a paper by N. Chen et al., "Peak-to-average power ratio reduction in OFDM with blind selected pilot tone modulation," *Proc. IEEE Intl. Conference on Acoustics, Speech, and Signal Processing*, pp. 845-848, Philadelphia, Pa., March 2005, blind SLM was carried out in conjunction with pilot symbol assisted modulation in OFDM. In contrast, the present blind SLM algorithm operates independently of any training sequences. It is simpler than the approaches by A. D. S. Jayalath et al., "A blind SLM receiver for PAR-reduced OFDM," *Proc. IEEE Vehicular Technology Conference*, pp. 219-222, September 2002 and outperforms the blind SLM algorithm discussed by Y. C. Cho, et al., "Selected mapping technique with novel phase sequences for PAPR reduction of an OFDM signal," *Proc. IEEE 60th Vehicular Technology Conference*, vol. 7, pp. 4781-4785, September 2004, by capitalizing on the constant modulus property of the PSK input signal.

Blind SLM Algorithm

In conventional SLM, the phases of $S_k$ are rotated but the amplitudes are left unchanged. The present algorithm scales the amplitudes and rotates the phases of $S_k$ as follows:

$$X_k^{(d)} = S_k \rho_k^{(d)} e^{j\phi_k^{(d)}}, \quad 1 \le d \le D, 0 \le k \le N-1, \tag{11}$$

where the $\phi_k^{(d)}$ table is constructed as usual. The amplitude sequences $\rho_k^{(d)} > 0$, $\rho_k^{(d_1)}$ and $\rho_k^{(d_2)}$ take on different shapes when $d_1 \ne d_2$. By default, $\rho_k^{(1)}=1$, and $\phi_k^{(1)}=0$, $\forall k$, corresponding to the original OFDM signal.

It is assumed that S has a constant amplitude $|S_k|=A$, $\forall k$, (i.e., PSK). To ensure that the average signal energy remains unchanged; i.e., $N^{-1}\Sigma_{k=0}^{N-1} E[|X_k^{(d)}|^2] = E[|S_k|^2] = A^2$, $$\sum_{k=0}^{N-1} [\rho_k^{(d)}]^2 = N. \tag{12}$$

Under the constant modulus assumption for $S_k$, from (11), $$|X_k^{(d)}| = A\rho_k^{(d)}. \tag{13}$$

An IDFT of $X_k^{(d)}$ is taken as in (1) to obtain $x_n^{(d)}$ and then the representation with the lowest PAR is selected for transmission:

$$\bar{d} = \arg\min_{1 \le d \le D} \text{PAR}\{x_n^{(d)}\}. \tag{14}$$

At the receiver, after removing the cyclic prefix and taking the DFT, we obtain $$Y_k = X_k^{(\bar{d})} H_k + V_k. \tag{15}$$

where $V_k$ is the DFT of the zero-mean additive noise $v_n$, and $H_k$ is the frequency response of the composite channel (a convolution of the transmit filter, the frequency selective channel, and the receive filter). Combining (13) and (15), $\rho_k^{(\bar{d})}$ can be estimated from $$\hat{\rho}_k^{(\bar{d})} = \frac{|Y_k|}{A|H_k|}, \tag{16}$$

where it is assumed that the fading channel frequency response $H_k$ is either known or has been accurately estimated.

Since the $\rho_k^{(d)}$ templates are known to both the transmitter and the receiver, then the index $\bar{d}$ can be estimated by finding the template that best matches the estimate in (16). For example, $$\bar{d} = \arg\min_{1 \le d \le D} \Sigma_{k=0}^{N-1} [|Y_k| - A|H_k|\Sigma_k^{(d)}]^2. \tag{17}$$

Since $\rho_k^{(d)}$ and $\phi_k^{(d)}$ are predetermined functions that are stored in the LUTs, and $H_k$ is assumed known, once $\bar{d}$ has been found, it is then straightforward to obtain the $S_k$ estimate from $$\hat{S}_k = \frac{Y_k}{H_k \rho_k^{(\bar{d})}} e^{j\phi_k^{(\bar{d})}}, \tag{18}$$

followed by minimum distance decoding.

The amplitude functions $\rho_k^{(d)}$ should be sufficiently different and satisfy the condition in equation (12). For example, when D=4, $$\rho_k^{(1)} = 1, \tag{19}$$

$$\rho_k^{(2)} = \sqrt{\alpha}, 0 \le k \le \frac{N}{2}-1, \text{ and } \sqrt{2-\alpha}, \frac{N}{2} \le k \le N-1, \tag{20}$$

$$\rho_k^{(3)} = \sqrt{2-\alpha}, 0 \le k \le \frac{N}{2}-1, \text{ and } \sqrt{\alpha}, \frac{N}{2} \le k \le N-1, \tag{21}$$

$$\rho_k^{(4)} = \sqrt{2-\alpha}, 0 \le k \le \frac{N}{4}-1, \tag{22}$$

$$\frac{3N}{4} \le k \le N-1, \text{ and } \sqrt{\alpha}, \frac{N}{4} \le k \le \frac{3N}{4}-1,$$

When D=2, the above $\rho_k^{(1)}$ and $\rho_k^{(2)}$ can be used. When D=3, the above $\rho_k^{(1)}$ through $\rho_k^{(3)}$ can be used. There are of course many other $\rho_k^{(d)}$ functions that can perform well.

The algorithm described above assumes $|S_k|=A$, $\forall k$. The algorithm works even if $S_k$ is $M_1$-ary PSK on some subcarriers but $M_2$-ary PSK on some other subcarriers with $M_1 \ne M_2$. If some of the carriers are null, then $\rho_k^{(d)}$ should be designed over the non-null subcarriers only.

The blind SLM algorithm described above assumes that the input $S_k$ is PSK for the entire OFDM block $0 \le k \le N-1$. In some OFDM systems, such as digital subscriber line (DSL) systems with bit loading, different bits can be assigned to different subcarriers according to the signal-to-noise ratio (SNR) at the individual subcarriers. In this case, the N subcarrier indices may be partitioned into two sets $C_1$ and $C_2$ where $S_k$ is PSK over $C_1$ but $S_k$ is non-PSK over $C_2$ and $C_1 \cup C_2 = \{k | 0 \leq k \leq N-1\}$. The blind SLM technique may be used for PAR reduction of such OFDM systems. Assume that the length of $C_1$ is $N_1$, the length of $C_2$ is $N_2$ and $N_1 + N_2 = N$. To apply blind SLM, rotate the phases of $\{S_k\}_{k=0}^{N-1}$ as usual according to the phase LUT $\{\phi_k^{(d)}\}_{0 \leq k \leq N-1}^{1 \leq d \leq D}$. The amplitudes of the non-PSK subcarriers are left unchanged; i.e., $\rho_k^{(d)} = 1$, $\forall d$, $k \in C_2$. The SLM index is embedded in the amplitude functions $$\{\rho_k^{(d)}\}_{k \in C_1}$$

to be applied to the PSK subcarriers. To enable blind SLM, $$\rho_k^{(d_1)}$$

for $k \in C_1$ and $$\rho_k^{(d_2)}$$

for $k \in C_1$ must be sufficiently distinct for $d_1 \neq d_2$. At the receiver, detection of the SLM index $\bar{d}$ is carried out using the received frequency domain signal $Y_k$ over $k \in C_1$. For example, instead of equation (17), the following equation may be used:

$$\hat{\bar{d}} = \text{argmin}_{1 \leq d \leq D} \sum_{k \in C_1} [|Y_k| - A|H_k|\rho_k^{(d)}|]^2.$$

Orthogonal frequency division multiple access (OFDMA) is used in the mobility mode of the IEEE 802.16 WirelessMAN (WiMAX) air interface standard. In OFDMA, the subcarriers are partitioned into Q disjoint sets $\{C_q\}_{q=1}^Q$ with $$\bigcup_{q=1}^{Q} C_q = \{k | 0 \leq k \leq N - 1\}.$$

The qth user occupies $C_q$. If at least one of the users utilizes PSK, the blind SLM technique can be applied in a manner similar to the bit loading scenario described above.

Closed-Form Expression for the CCDF of the PAR

When the condition in (7) is satisfied, $$X_k^{(d_1)}$$

and $$X_k^{(d_2)}$$

for $d_1 \neq d_2$ are mutually uncorrelated. Thus, their time domain counter-parts $$x_n^{(d_1)}$$

and $$x_n^{(d_2)}$$

are also mutually uncorrelated. When N is large, $x_k^{(d)}$ is approximately Gaussian distributed by virtual of the Central Limit Theorem. Since for Gaussian random variables, zero covariance also means statistical independence, we thus infer that the different time domain representations $x_n^{(d)}$ are mutually independent. This provides for the following CCDF relationship for the PAR of the present SLM algorithm:

$$\Pr(\text{PAR}\{x_n^{(d)}\} > \gamma) = (\Pr(\text{PAR}\{x_n^{(d)}\} > \gamma))^D. \quad (23)$$

For a given d, if $\rho_k^{(d)}$ is stationary in k, then $X_k^{(d)}$ in equation (11) is stationary in k as well. In that case, using the tools disclosed by D. R. Brillinger, *Time Series: Data Analysis and Theory*, Holden-day Inc., San Francisco, 1981, it can be shown that $\Pr(\text{PAR}\{x_n^{(d)}\} > \gamma)$ is given by equations (3) or (4), depending on the circular symmetry of $X_k^{(d)}$. Furthermore, if the phase functions $\phi_k^{(d)}$ are mutually independent satisfying equation (7), then the performance of the SLM algorithm, in terms of the distribution of the PAR, is the same as the SLM algorithm discussed in the R. W. Bauml, et al. and D. J. G. Mestdagh, et al. papers.

Using pseudo-random $\rho_k^{(d)}$ functions is an option. Although the deterministic $\rho_k^{(d)}$ functions described in equations (19)-(22) cannot be treated as stationary, we find that $x_n^{(d)}$ and $x_{n+m}^{(d)}$ are still approximately uncorrelated (or independent since they are approximately Gaussian) for all but a few $m \neq 0$ values. Therefore, $\Pr(\text{PAR}\{x_n^{(d)}\} > \gamma)$ can still be approximated by equations (3) or (4), depending on the circular symmetry of $X_k^{(d)}$. The accuracy of equations (9) and (10) for the SLM technique will be demonstrated by way of numerical examples in simulations discussed below.

PAR Thresholding

Under the constraint in equation (12), $|X_k^{(d)}|^2 > |S_k|^2$ at some of the subcarriers but $|X_k^{(d)}|^2 < |_k|^2$ at the other subcarriers. When noise is present, bit error rate (BER) or symbol error rate (SER) may increase at the receiver. Take for example, the amplitude functions given in equations (19)-(22). A larger $\alpha(1 < \alpha < 2)$ makes the $\rho_k^{(d)}$ functions more distinct from each other, which reduces the detection error rate in $\bar{d}$. The downside is that SER at the weaker signal subcarriers can be so high that it dominates the overall SER. Such a tradeoff should be carefully considered in the design of the $\rho_k^{(d)}$ functions in order to minimize the overall SER.

For many practical systems, a PAR threshold $\gamma$ is usually predetermined according to the system power efficiency or linearity constraints. The objective is often to ensure that the transmitted signal has a PAR that exceeds $\gamma$ only very rarely (e.g., no more than $10^{-4}$ in probability). In other words, minimizing or reducing the PAR to much below than $\gamma$ is not necessary. Under this PAR thresholding paradigm, SLM is carried out until the first $x_n^{(d)}$ that meets the PAR threshold has been found. The number of actual mappings conducted is between 1 and D. Sometimes, the given OFDM block already has a PAR that is smaller than $\gamma$; in that case, PAR reduction is not performed and the block is transmit as is. On the other hand, if after all D mappings, the resulting PAR is still larger than $\gamma$, $x_n^{(d)}$ is transmitted, despite the fact that it will be clipped. This approach not only lowers the computational cost, but also ensures that SLM is not performed unnecessarily. The constant amplitude function is preferred, which corresponds to $d=1$, for SER reasons.

Simulations

Figure 5A:
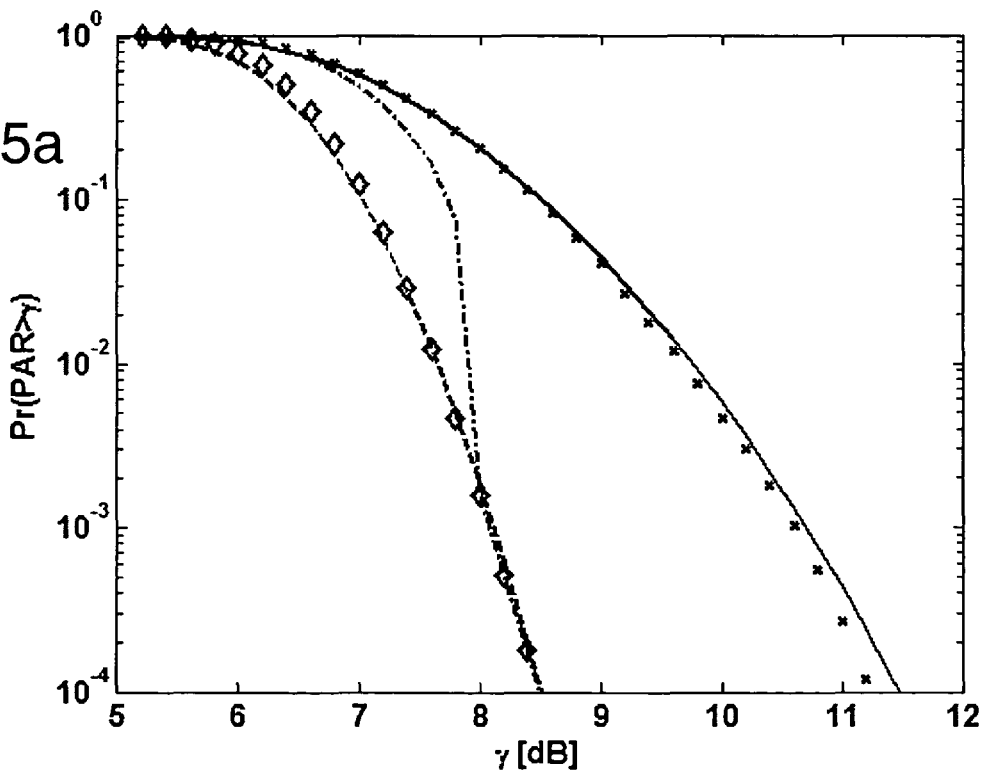
FIGS. 5a-5c are graphs showing theoretical and empirical CCDF curves of SLM OFDM signals when $S_k$ is BPSK or QPSK.

The PAR reducing capability is assessed by examining the CCDF of the resulting PAR values. In the following example, it is assumed that the input $S_4$ is drawn from a quadrature PSK (QPSK) constellation with $|S_k| = A = 1$. Each OFDM block has N=128 subcarriers. The number of different mappings D=4 (including the original OFDM sequence). Except for d=1, $$e^{j\phi_k^{(d)}}$$

is i.i.d. ±1 with equal probability. The amplitude sequences $\rho_k^{(1)}$ through $\rho_k^{(4)}$ are given in equations (19)-(22) with α=1.4. A total of $10^5$ OFDM blocks were simulated to construct the empirical CCDF curves. FIG. 5(a) shows the theoretical CCDF curves described by equation (3) (solid line) and equation (9) (dashed line), respectively, for the original OFDM signal $s_n$ and the SLM OFDM signal $x_n^{(d)}$. The crosses and the diamonds correspond to the empirical CCDF values obtained from Monte Carlo simulations. The empirical CCDFs agreed with the closed-form expressions fairly well. At the $10^{-4}$ CCDF level, 2.7 dB of PAR reduction was achieved. The dash-dotted line corresponds to the case where PAR thresholding (threshold=8 dB) was used; its CCDF is upper-bounded by equation (3) and lower-bounded by equation (9). With 20.47% of the chance, the PAR of the original OFDM signal exceeds 8 dB. With SLM or PAR thresholding SLM, the chance that the resulting PAR exceeds 8 dB is reduced to 0.16%.

Figure 5B:
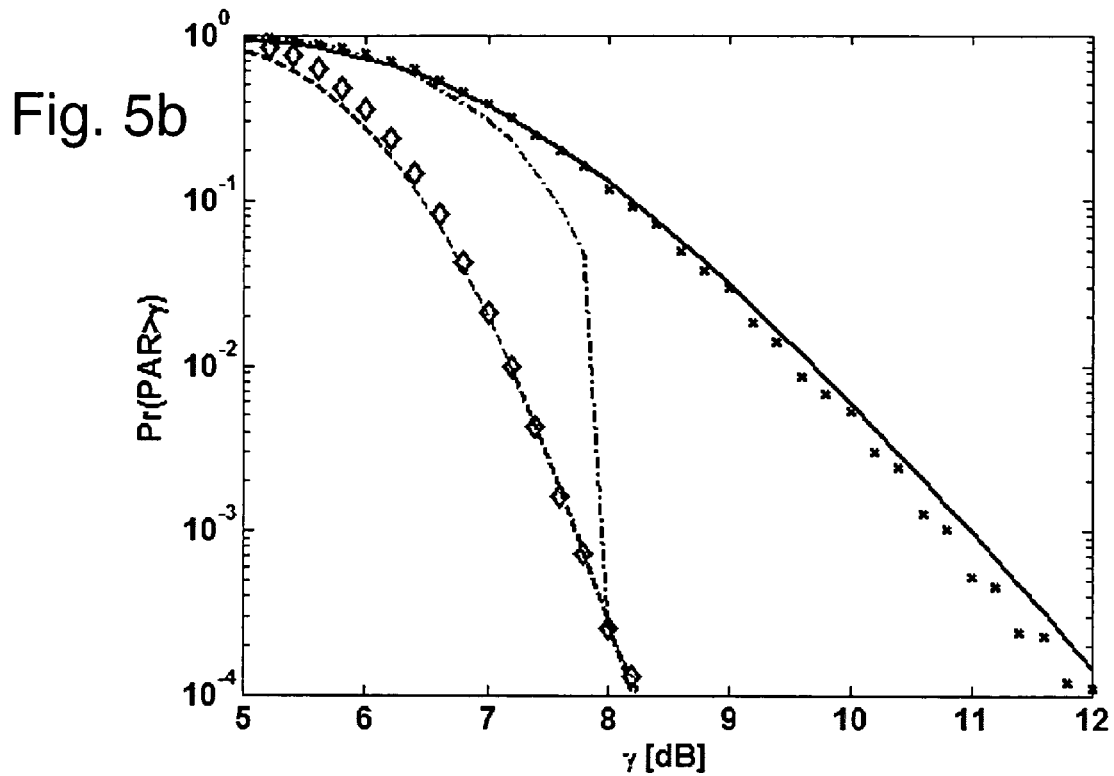

Similar parameters were used in generating the curves in FIG. 5(b), except that $S_k$ was drawn from the BPSK constellation. The solid line in FIG. 5(b) was calculated from equation (4); the dashed line was calculated from equation (10). At the $10^{-4}$ CCDF level, 3.7 dB of PAR reduction was achieved, 1 dB better than for the QPSK case. It was found that with 11.81% of the time, the PAR of the original OFDM signal exceeds 8 dB. With SLM or PAR thresholding SLM, the chance that the resulting PAR exceeds 8 dB is drastically reduced to 0.025%.

Figure 5C:
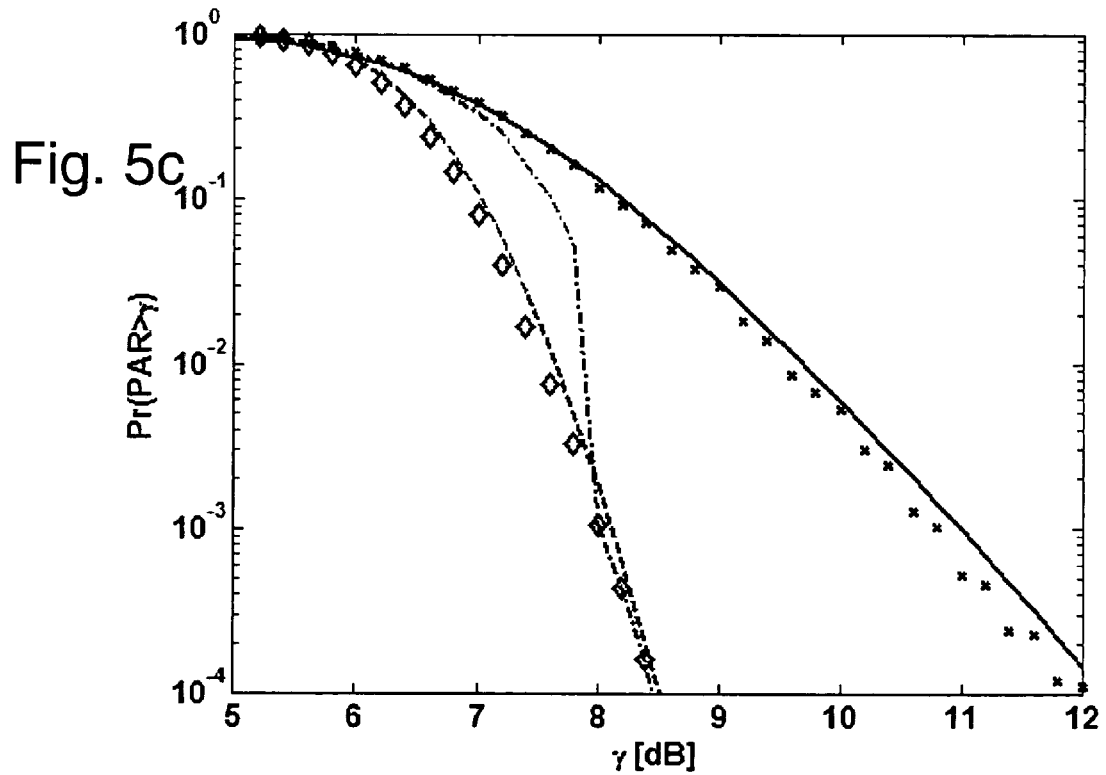

The parameters for FIG. 5(c) are the same as those for FIG. 5(b) except that $\phi_k^{(d)}$ is now i.i.d. uniformly distributed in [0, 2π). Although $S_k$ is BPSK (and thus real-valued), $$S_k e^{j\phi_k^{(d)}}$$

becomes circularly symmetric. In FIG. 5(c), the solid line is plotted according to equation (3) but the dashed line according to equation (10). Again, the simulation results agreed with the theoretical analysis. Comparing FIG. 5(b) and FIG. 5(c), it is seen that for the BPSK input, the sign table yielded better performance than the [0, 2π) pseudo-random phase table. This is consistent with the information revealed in FIG. 4.

Blind Detection of $\bar{d}$

Define the signal-to-noise ratio (SNR) in dB as $$SNR = 10\log_{10}\frac{A^2}{\sigma_v^2} \quad (24)$$

where $A=|S_k|$ and $\sigma_v^2$ is the variance of the additive noise $v_m$. Thanks to the condition in equation (12), the average transmit power remains unchanged:

$$\frac{1}{N}\sum_{n=0}^{N-1} E[|x_n^{(d)}|] = \frac{1}{N}\sum_{k=0}^{N-1} E[|X_k^{(d)}|^2] = E[|S_k|^2] = A^2 \ldots$$

In the following example, an additive white Gaussian noise (AWGN) channel is assumed with SNR=5 dB. The input $S_k$ is drawn from the QPSK constellation; the OFDM block length N=64 and the number of mappings D=4.

Figure 6A:
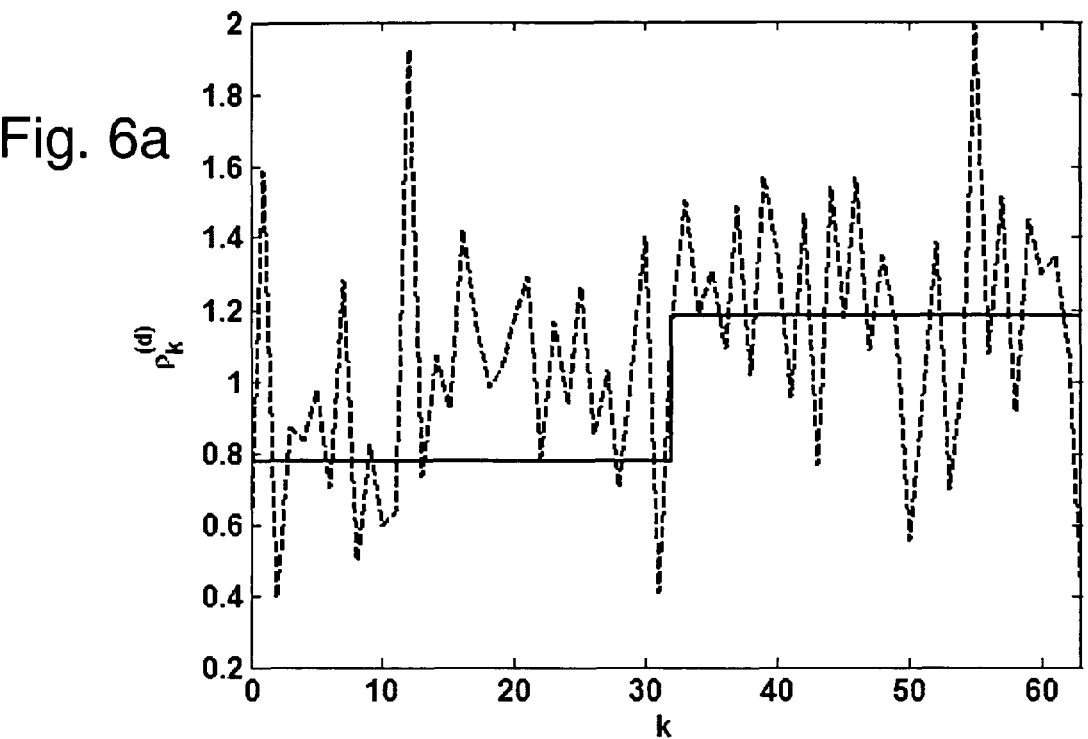
FIGS. 6a and 6b are graphs showing estimated and best matched amplitude modulation functions.
Figure 6B:
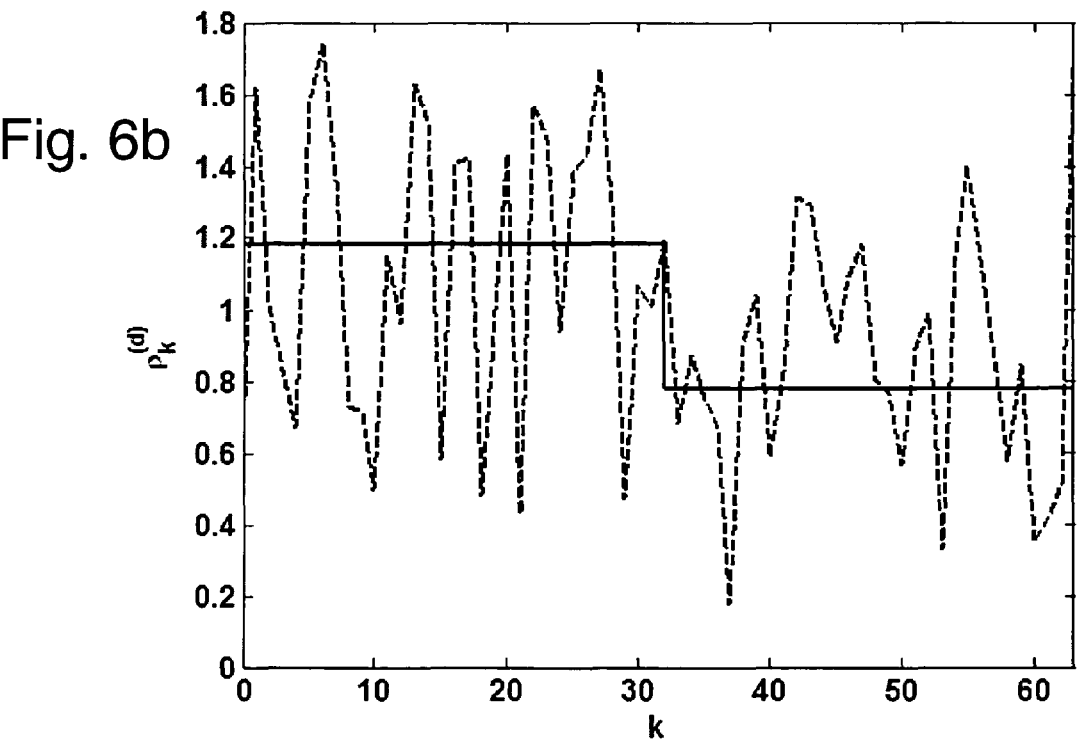

FIGS. 6a and 6b show the $\hat{\rho}_k^{(d)}$ estimates (dashed lines) for two different realizations (OFDM blocks). The solid line depicts the $\rho_k^{(d)}$ function that best matched the $\hat{\rho}_k^{(d)}$ estimate from among the set of D candidate amplitude functions. Correct $\bar{d}$ estimates, $\bar{d}=3$ for FIG. 6a and $\bar{d}=2$ for FIG. 6b, were obtained.

Detection Error Rates in $\bar{d}$

Next, the accuracy of the blind detection of $\bar{d}$ in the presence of noise is examined. The input signal $S_k$ is BPSK. D=4 mappings were used:

$$e^{j\phi_k^{(d)}} = \pm 1;$$

i.e., pseudo-random sign changes were used, and $\rho_k^{(d)}$ are given in equations (19)-(22). At each SNR, $10^5$ OFDM blocks were generated based on which we calculated the detection error rates in the $\bar{d}$ estimates. Results for OFDM block sizes N=64, N=128 and N=256 are shown in Table I for the case with α=1.4 and in Table II for the case with α=1.6. From Tables I and II, it can be seen that the detection error rate in $\bar{d}$ consistently declined as the OFDM block length N increased or when the SNR improved. Moreover, when a larger α value is used, it is easier to differentiate the $\rho_k^{(d)}$ waveforms, and thus lower the corresponding detection error rate in $\bar{d}$.

Since the SLM algorithm is a distortionless method, once the correct $\bar{d}$ is found, the SER performance will be solely determined by the weighted average of the symbol error rates of the PSK constellation at the scaled SNRs (scale by $[\rho_k^{(\bar{d})}]^2$). On the other hand, if $\bar{d}$ is estimated incorrectly, the symbol error rate for the particular OFDM block will be high.

TABLE I

| SNR | 2 dB | 4 dB | 6 dB | 8 dB | 10 dB |
| --- | --- | --- | --- | --- | --- |
| N = 64 | 0.2139 | 0.0903 | 0.0268 | 0.0046 | 0.0002 |
| N = 128 | 0.1346 | 0.0297 | 0.0029 | 0.0001 | 0 |
| N = 256 | 0.0690 | 0.0048 | 0.0001 | 0 | 0 |

TABLE II

| SNR | 2 dB | 4 dB | 6 dB | 8 dB | 10 dB |
| --- | --- | --- | --- | --- | --- |
| N = 64 | 0.1335 | 0.0246 | 0.0016 | 0.0000 | 0 |
| N = 128 | 0.0715 | 0.0031 | 0.0000 | 0 | 0 |
| N = 256 | 0.0233 | 0.0001 | 0 | 0 | 0 |

BER Example

Figure 7:
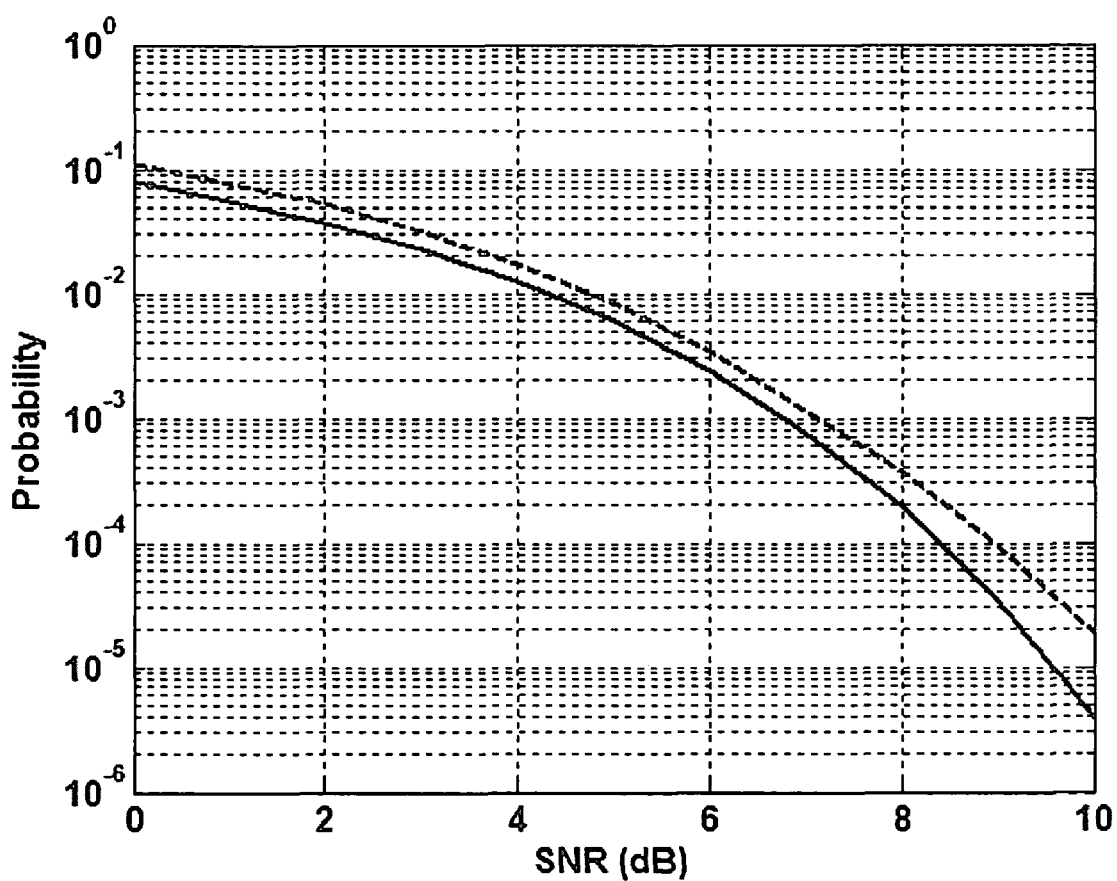
FIG. 7 illustrates theoretical bit error rate (BER) for the BPSK constellation and the empirical BER for the disclosed blind SLM technique.

Below is an example where the blind SLM method is used in conjunction with PAR thresholding. The input signal is BPSK ∈{1,−1}; the OFDM block length N=128 and the PAR threshold is 8 dB. Amplitude functions in equations (19)-(22) with α=1.4 were used. An AWGN channel was assumed. In FIG. 7, the solid line corresponds to the theoretical BER $Q(\sqrt{2SNR})$, where Q(x) is the CCDF of the standard Gaussian distribution. The dashed line corresponds to the empirical BER obtained from $10^5$ Monte Carlo runs at each SNR. Comparing the two curves, the blind SLM method incurred a small amount of SNR loss (e.g., 0.6 dB at $10^{-4}$ BER). However, from FIGS. 5a-5c, 3.7 dB of PAR reduction was achieved so the PAR reduction had more than compensated for the SNR loss.

The disclosed algorithm overcomes the side information transmission issue in SLM by linking the phase (or the sign) sequence index d to a set of distinct amplitude functions.

The disclosed method enjoys the same PAR reduction performance as the SLM method disclosed in the R. W. Bauml, et al. and D. J. G. Mestdagh, et al. papers. It does not lead to any average power increase, and is simple to implement. The disclosed method takes advantage of the constant modulus nature of the PSK input signal.

Thus, an SLM method has been disclosed which has the same PAR reducing capability as the SLM algorithm, disclosed in the R. W. Bauml, et al. and D. J. G. Mestdagh, et al. papers, but allows for blind detection of the SLM index for constant modulus inputs. Closed-form expressions for the CCDF of the PAR are used in the disclosed SLM algorithm. The disclosed SLM method is simple to implement and makes SLM more practical because the transmission of side information is not required.

Thus, apparatus and techniques have been disclosed that provide for PAR (or crest factor) reduction in OFDM systems using blind SLM. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Communication apparatus, comprising:
   (1) a transmitter comprising:
   a plurality of invertible differentiating transforms for processing a constant modulus frequency domain signal to generate a plurality of different sub-channel signals;
   a plurality of amplitude tagging processes for uniquely identifying each of the sub-channel signals by way of a unique amplitude tag embedded in the respective sub-channel signal;
   a plurality of inverse discrete Fourier transforms for respectively inverse Fourier transforming the sub-channel signals into the time domain;
   a plurality of upsampling processes for upsampling the inverse Fourier transformed sub-channel signals;
   a process for calculating the crest factor for each of the upsampled sub-channel signals and for selecting the sub-channel signal having the minimum crest factor;
   a digital-to-analog (D/A) converter for converting the selected sub-channel signal having the minimum crest factor to an analog signal for transmission; and
   a power amplifier for amplifying the analog signal for transmission over a communication channel; and
   (2) a receiver comprising:
   an analog-to-digital converter for digitizing a received analog signal;
   a discrete Fourier transform for transforming the digitized received signal into the frequency domain;
   an amplitude tag detector for detecting the unique amplitude tag embedded in the received signal;
   an inverse process for processing the received signal using an inverse transform of the identified differentiating transform; and
   a symbol detector for detecting the constant modulus frequency domain signal transmitted by the transmitter.

2. The apparatus recited in claim 1,
   wherein the transmitter comprises:
   an amplitude lookup table comprising a plurality of distinct amplitude functions;
   a plurality of amplitude modulation processes for processing the constant modulus frequency domain signal using the distinct amplitude functions to generate a plurality of different sub-channel signals having different amplitude tags in each sub-channel signal;
   a phase lookup table comprising a plurality of pseudo-random phase sequences; and
   a plurality of phase rotation processes for rotating phases of the sub-channel signals using the respective pseudo-random phase sequences to generate the sub-channel signals;
   and wherein the receiver comprises:
   an amplitude tag detector for detecting the amplitude tags in each sub-channel signal by matching the estimated amplitude function with the distinct amplitude function templates;
   a phase lookup table for selecting a phase de-rotation sequence associated with a detected amplitude tag; and
   a phase de-rotation process for de-rotating the phases of the Fourier transformed signal using the phase de-rotation sequence from the phase lookup table.

3. The apparatus recited in claim 2, wherein the amplitude and phase lookup tables are formed off-line and stored in both the transmitter and the receiver.

4. The apparatus recited in claim 2, wherein elements of the phase lookup table are generated pseudo-randomly to make $$E\left[e^{j\phi_h^{(d)}}\right] = 0$$

or $$E\left[e^{j\phi_k^{(d)}}\right] = 0$$

where E stands for the expected value operation.

5. The apparatus recited in claim 1, wherein each different sub-channel signal generated by the transmitter comprises the constant modulus input signal phase rotated according to a unique phase rotation sequence stored in a phase lookup table and multiplied by a corresponding unique amplitude sequence stored in an amplitude lookup table.

6. The apparatus recited in claim 1, wherein the amplitude tag detector determines the amplitude sequence used to generate the transmitted signal by comparing the magnitude of the frequency domain received signal with candidate sequences formed by multiplying the amplitude sequences in the amplitude lookup table with the magnitude of the channel frequency response and the modulus of the constant modulus signal, and selecting the candidate sequence having the least matching error.

7. Communication apparatus, comprising:
   (1) a transmitter comprising:
   an amplitude lookup table comprising a plurality of distinct amplitude functions;
   a plurality of amplitude tagging processes for processing a constant modulus frequency domain signal using the distinct amplitude functions to generate a plurality of different sub-channel signals;
   a phase lookup table comprising a plurality of pseudo-random phase sequences;
   a plurality of phase rotation processes for rotating phases of the sub-channel signals using the respective pseudo-random phase sequences;
   a plurality of inverse discrete Fourier transforms for inverse Fourier transforming the respective sub-channel signals into the time domain;
   a plurality of upsampling processes for upsampling the inverse Fourier transformed sub-channel signals;

a process for calculating the crest factor for each of the upsampled sub-channel signals to select the sub-channel signal having the minimum crest factor;

a digital-to-analog converter for converting the selected sub-channel signal having the minimum crest factor to an analog signal for transmission over a communication channel; and a power amplifier for amplifying the analog signal for transmission; and (2) a receiver comprising:

an analog-to-digital converter for digitizing the received analog signal;

a discrete Fourier transform for transforming the digitized received signal into the frequency domain;

an amplitude tag detector for detecting the amplitude tag in each sub-channel signal by matching the estimated amplitude function with the distinct amplitude function templates;

a phase lookup table for selecting a phase de-rotation sequence associated with the detected amplitude tag;

a phase de-rotation process for de-rotating the phases of the Fourier transformed signal using the phase de-rotation sequence from the phase lookup table; and a symbol detector for detecting the constant modulus frequency domain signal transmitted by the transmitter.

8. The apparatus recited in claim 7, wherein the amplitude and phase lookup tables are formed off-line and stored in both the transmitter and the receiver.

9. The apparatus recited in claim 7, wherein elements of the phase lookup table are generated pseudo-randomly to make $$E\left[e^{j\phi_h^{(d)}}\right] = 0$$

or $$E\left[e^{j\phi_k^{(d)}}\right] = 0$$

where E stands for the expected value operation.

10. The apparatus recited in claim 7, wherein each different sub-channel signal generated by the transmitter comprises the constant modulus input signal phase rotated according to a unique phase rotation sequence stored in a phase lookup table and multiplied by a corresponding unique amplitude sequence stored in an amplitude lookup table.

11. The apparatus recited in claim 7, wherein the amplitude tag detector determines the amplitude sequence used to generate the transmitted signal by comparing the magnitude of the frequency domain received signal with candidate sequences formed by multiplying the amplitude sequences in the amplitude lookup table with the magnitude of the channel frequency response and the modulus of the constant modulus signal, and selecting the candidate sequence having the least matching error.

12. A method comprising:

processing a constant modulus frequency domain source signal using a plurality of unique amplitude tags and a plurality of invertible transforms to transform the source signal into a plurality of unique sub-channel signals;

upsampling the inverse Fourier transformed sub-channel signals;

calculating the crest factor for each of the upsampled sub-channel signals and selecting the sub-channel signal having the minimum crest factor;

transmitting an analog version of the selected sub-channel signal over a communication channel;

digitizing the received signal;

Fourier transforming the digitized received signal into the frequency domain;

detecting the unique amplitude tag associated with the digitized received signal;

identifying the invertible transform associated with the detected amplitude tag; and detecting the constant modulus frequency domain source signal transmitted by the transmitter.

13. The method recited in claim 12, wherein transmitting the analog version of the selected sub-channel signal comprises:

inverse Fourier transforming the respective sub-channel signals into the time domain;

upsampling the inverse Fourier transformed sub-channel signals; and amplifying the analog signal prior to transmission over the communication channel.

14. The method recited in claim 12, wherein:

processing the frequency domain source signal comprises processing a frequency domain signal to generate a plurality of different sub-channel signals having different amplitude tags in each sub-channel signal, and rotating phases of the respective sub-channel signals using a plurality of pseudo-random phase sequences to generate the sub-channel signals; and wherein identifying the invertible transform comprises selecting a phase de-rotation sequence associated with the detected amplitude tags, and de-rotating the phases of the Fourier transformed signal using the phase de-rotation sequence from the phase lookup table.

15. The method recited in claim 12, wherein the amplitude and phase lookup tables are formed off-line and stored in both the transmitter and the receiver.

16. The method recited in claim 12, wherein elements of the phase rotation sequences are generated pseudo-randomly to make $$E\left[e^{j\phi_h^{(d)}}\right] = 0$$

or $$E\left[e^{j\phi_k^{(d)}}\right] = 0$$

where E stands for the expected value operation.

17. The method recited in claim 12, wherein each different sub-channel signal generated by the transmitter comprises the constant modulus input signal phase rotated according to a unique phase rotation sequence stored in a phase lookup table and multiplied by a corresponding unique amplitude sequence stored in an amplitude lookup table.

18. The method recited in claim 12, wherein detecting the unique amplitude tag determines the amplitude sequence used to generate the transmitted source signal by comparing the magnitude of the frequency domain received signal with candidate sequences formed by multiplying the amplitude sequences in an amplitude lookup table with the magnitude of the channel frequency response and the modulus of the constant modulus signal, and selecting the candidate sequence having the least matching error.

* * * * *